(12) United States Patent
Shoda et al.

(10) Patent No.: US 8,076,890 B2
(45) Date of Patent: Dec. 13, 2011

(54) AC MOTOR DRIVING APPARATUS AND CONTROL METHOD

(75) Inventors: Kazuo Shoda, Tokyo (JP); Yuki Nomura, Tokyo (JP); Yoshifumi Nagato, Tokyo (JP)

(73) Assignee: THK Co., Ltd., Tokyo (JP)

( * ) Notice: Subject to any disclaimer, the term of this patent is extended or adjusted under 35 U.S.C. 154(b) by 537 days.

(21) Appl. No.: 12/295,069

(22) PCT Filed: Mar. 26, 2007

(86) PCT No.: PCT/JP2007/056261
§ 371 (c)(1),
(2), (4) Date: Dec. 16, 2008

(87) PCT Pub. No.: WO2007/114109
PCT Pub. Date: Oct. 11, 2007

(65) Prior Publication Data
US 2009/0322265 A1  Dec. 31, 2009

(30) Foreign Application Priority Data

Mar. 31, 2006  (JP) ................................ 2006-098311
Apr. 28, 2006  (JP) ................................ 2006-124930

(51) Int. Cl.
*H02P 27/00* (2006.01)
*G05B 11/28* (2006.01)
(52) U.S. Cl. .................... 318/599; 318/811; 318/700
(58) Field of Classification Search ............. 318/400.11, 318/400.26, 700, 599, 811; 363/142; 702/107, 702/117, 125; 324/76.28, 601; 327/554, 327/558
See application file for complete search history.

(56) References Cited

U.S. PATENT DOCUMENTS

| | | | | |
|---|---|---|---|---|
| 4,383,209 A | * | 5/1983 | Lewis | 318/696 |
| 4,667,118 A | * | 5/1987 | Maruta | 327/176 |

(Continued)

FOREIGN PATENT DOCUMENTS

| | | | |
|---|---|---|---|
| JP | 57173396 A | * | 10/1982 |
| JP | 3-265486 A | | 11/1991 |
| JP | 2002-369598 A | | 12/2002 |
| JP | 2003-37993 A | | 2/2003 |

OTHER PUBLICATIONS

Notification of Transmittal of Translation of the International Preliminary Report on Patentability (Form PCT/IB/338) of International Application No. PCT/JP2007/056261 mailed Oct. 30, 2008 with Forms PCT/IB/373 and PCT/ISA/237. International Search Report of PCT/JP2007/056261, date of mailing Jun. 19, 2007.

*Primary Examiner* — Eduardo Colon Santana
(74) *Attorney, Agent, or Firm* — Westerman, Hattori, Daniels & Adrian, LLP (57) ABSTRACT

Provided is an AC motor driving apparatus and an AC motor control method capable of utilizing the conventional PWM system as-is even in an ultra-compact AC motor having an extremely few turns of exciting coil and preventing occurring of vibration and noise. The AC motor driving apparatus has an inverter converting a DC voltage to an AC voltage and supplying the AC voltage to an AC motor; a PWM device controlling a magnitude and a frequency of an output voltage of the inverter and means for changing a time constant of the AC motor in accordance with a carrier frequency of the PWM device. Between the PWM device and the AC motor, there is provided a condenser and/or a coil for adjusting the time constant, and the capacity thereof is adjusted in accordance with the carrier frequency of the PWM device.

12 Claims, 8 Drawing Sheets

U.S. PATENT DOCUMENTS

| | | | |
|---|---|---|---|
| 5,444,351 A * | 8/1995 | Yamamura et al. | 318/811 |
| 5,444,595 A * | 8/1995 | Ishikawa et al. | 361/86 |
| 5,640,073 A * | 6/1997 | Ikeda et al. | 318/400.03 |
| 5,796,545 A * | 8/1998 | Canclini | 360/78.04 |
| 7,279,874 B2 * | 10/2007 | Masuda | 323/282 |
| 2010/0111134 A1 * | 5/2010 | Matsumoto | 374/43 |

* cited by examiner

AC MOTOR DRIVING APPARATUS AND CONTROL METHOD

TECHNICAL FIELD

The present invention relates to control of an AC motor, and particularly to an AC motor driving apparatus and control method for controlling and driving a motor having small time constant by using the PWM (Pulse Width Modulation) system of controlling pulse number, pulse interval, pulse width and the like of pulse-shaped voltages and outputting voltages equivalent to output frequencies.

BACKGROUND ART

A linear motor actuator, which is greatly used in various tables of machine tools, moving parts of industrial robots, various conveyer apparatus and the like, has functions of giving linear motion to a movable body such as a table and stopping the movable body at a predetermined position. This linear motor actuator is driven by using an AC linear synchronous motor. The AC linear synchronous motor is structured to have a stator and a mover, and an exciting coil of copper wire is formed on a part of the stator or the mover. When exciting current is made to pass through the exciting coil to generate a driving force, linear movement is achieved.

Here, the rotational speed of the AC motor (linear movement speed of the linear motor) is fundamentally proportional to a supplied frequency. Hence, the AC motor is controlled by a method of once converting current from a commercial power source into direct current and then converting the direct current as the power source into alternate current having any frequency. In the AC motor control using an inverter as a power converter for converting DC power to AC power, the PWM (Pulse Width Modulation) system is often used in which the pulse width ratio is changed by controlling the width of output voltage wave or chopping a half cycle of the output voltage wave.

In the AC motor control of controlling the number of pulses, the pulse interval, the pulse width and the off time to output a voltage equivalent corresponding to output frequency, the time constant of the motor is an important parameter. However, as the mover of the conventional linear motor actuator has a weight of a certain level or more, the influence of the electric parameter of the AC motor on the actuator is very small as compared with the influence of the mechanical time constant (inertia) and insignificant.

Associated with downsizing and weight reduction of the liner motor actuator, there has been produced an ultra-compact AC linear synchronous motor having only a few turns of exciting coil, which makes apparent the problems that 1) when the PWM system is used as-is in the ultra-compact AC linear synchronous motor, the number of turns of the exciting coil is very small and the time constant (L/R) becomes very small, resulting in quick current response to the voltage and uncontrollability of the current, and 2) although the waveform of current passing through the exciting coil is preferably a sine wave, harmonic components are convoluted to vibrate the motor or cause noise, and the like.

The following patent document 1 discloses a related art of using the inductance of the exciting coil as a motor control parameter in the AC motor control. The patent document 1 relates to a motor and its control method. According to the patent document 1, there was a problem that although the inductance of the motor coil varies depending on the number of rotation times of the motor, the temperature and the like, the motor applied voltage and motor current were calculated with use of a fixed value of the inductance, resulting in reduction in the motor efficiency. As measures to solve this problem, the patent document 1 discloses extracting a motor constant based on a use environment of the motor and generating a control signal based on the extracted motor constant. However, the technique of the patent document 1 does not serve to solve the problems of a ultra-compact AC motor control having an extremely small time constant, which differs from the present invention, and there is hardly any other document which discloses the technique to solve such problems.

[Patent Document 1] Japanese Patent Laid-open Publication No. 2002-369598

DISCLOSURE OF INVENTION

Problems to be Solved by the Invention

The present invention has an object to provide an AC motor driving apparatus and an AC motor control method capable of utilizing the conventional PWM system as-is even in an ultra-compact AC motor having an extremely few turns of exciting coil and preventing occurring of vibration and noise.

Means for Solving the Problem

The present invention is an AC motor driving apparatus comprising an inverter converting a DC voltage to an AC voltage and supplying the AC voltage at least to an AC motor; a PWM device controlling a magnitude and a frequency of an output voltage of the inverter; and means for changing a time constant of the AC motor in accordance with a carrier frequency of the PWM device.

As the AC motor with an extremely few turns (several turns) of motor exciting coil has a very small time constant (L/R), a current response to the voltage becomes quick. This results in difficulty in motor control. However, if the time constant of the AC motor is adjusted in accordance with the PWM carrier frequency, the current waveform of the exciting coil is made close to the sine wave and this enables control of the ultra-compact AC motor having a small time constant.

As the time adjusting coil and/or condenser for adjusting the motor time constant is provided between the PWM device and the AC motor and its capacity is controlled in accordance with the carrier frequency, it is possible to achieve an appropriate motor time constant and thereby to control the ultra-compact AC motor.

In addition, the switching element is provided in parallel with the time constant adjusting coil, and the switching element is turned on so that current does not pass through the time constant adjusting coil during a time period of pulses first output by the PWM device at starting of the AC motor. This control makes it possible to reduce the time constant at starting up of the AC motor and hasten rising of the current. After rising up of the current, the switching element is turned off and thereby the current waveform becomes even thereby enabling ideal control.

Effects of the Invention

According to the present invention, it is possible to provide an AC motor driving apparatus capable of utilizing the conventional PWM system as-is even in an ultra-compact AC motor having an extremely few turns of exciting coil and preventing vibration and noise of the motor.

BRIEF DESCRIPTION OF REFERENCES 1 base member
2 raceway rail
3 slide table
4 AC linear synchronous motor
5 slide block
6 table plate
40 stator magnet
41 exciting coil
100 AC motor driving apparatus
101 time constant adjusting part
111 time constant adjusting coil
112 switching element (triac)

BEST MODES FOR CARRYING OUT THE INVENTION

Figure 1:
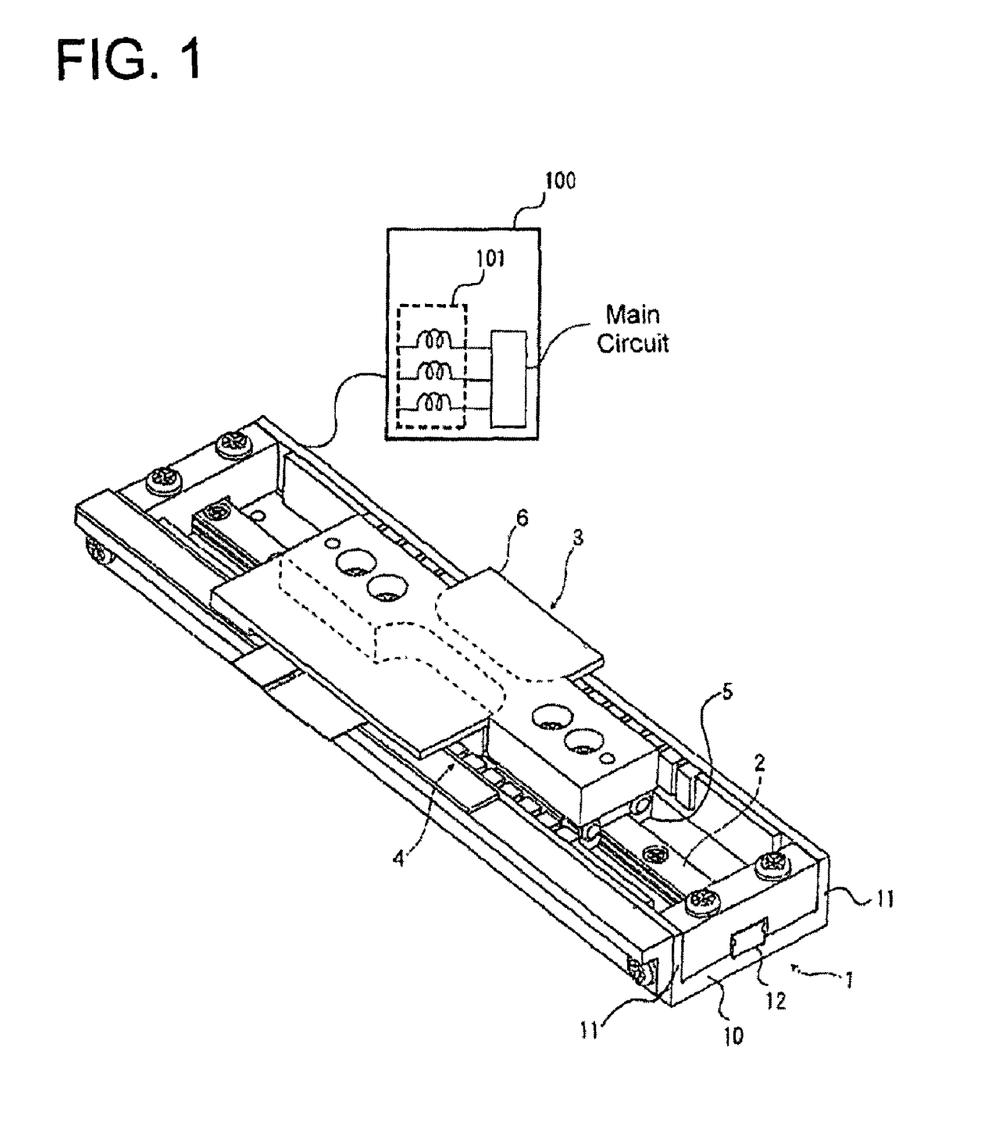
FIG. 1 is a perspective view showing an example of a linear motor actuator.

FIG. 1 is a perspective view showing an embodiment of a linear motor actuator to which an AC motor driving apparatus of the present invention is applied. This linear motor actuator has a base member 1; a raceway rail 2 laying on the base member 1; a slide table 3 capable of moving back and forth along the raceway rail 2; an AC linear synchronous motor 4 for driving the slide table 3 above the base member 1; and a AC motor driving apparatus 100. Here, the AC motor driving apparatus 100 is equipped with a PWM device having a carrier frequency of 8 kHz.

The base member 1 which is a component of the linear motor actuator has a bottom plate 10 and a pair of side walls 11, 11 provided standing at respective sides of the bottom plate 10, and the base member 1 is formed like a channel. In the bottom plate 10, there is formed a mounting groove 12 for positioning the raceway rail 2 along the longitudinal direction of the base member 1.

In addition, the slide table 3 has a slide block 5 moving along the raceway rail 2 and a table plate 6 fixed to the slide block 5.

Figure 2:
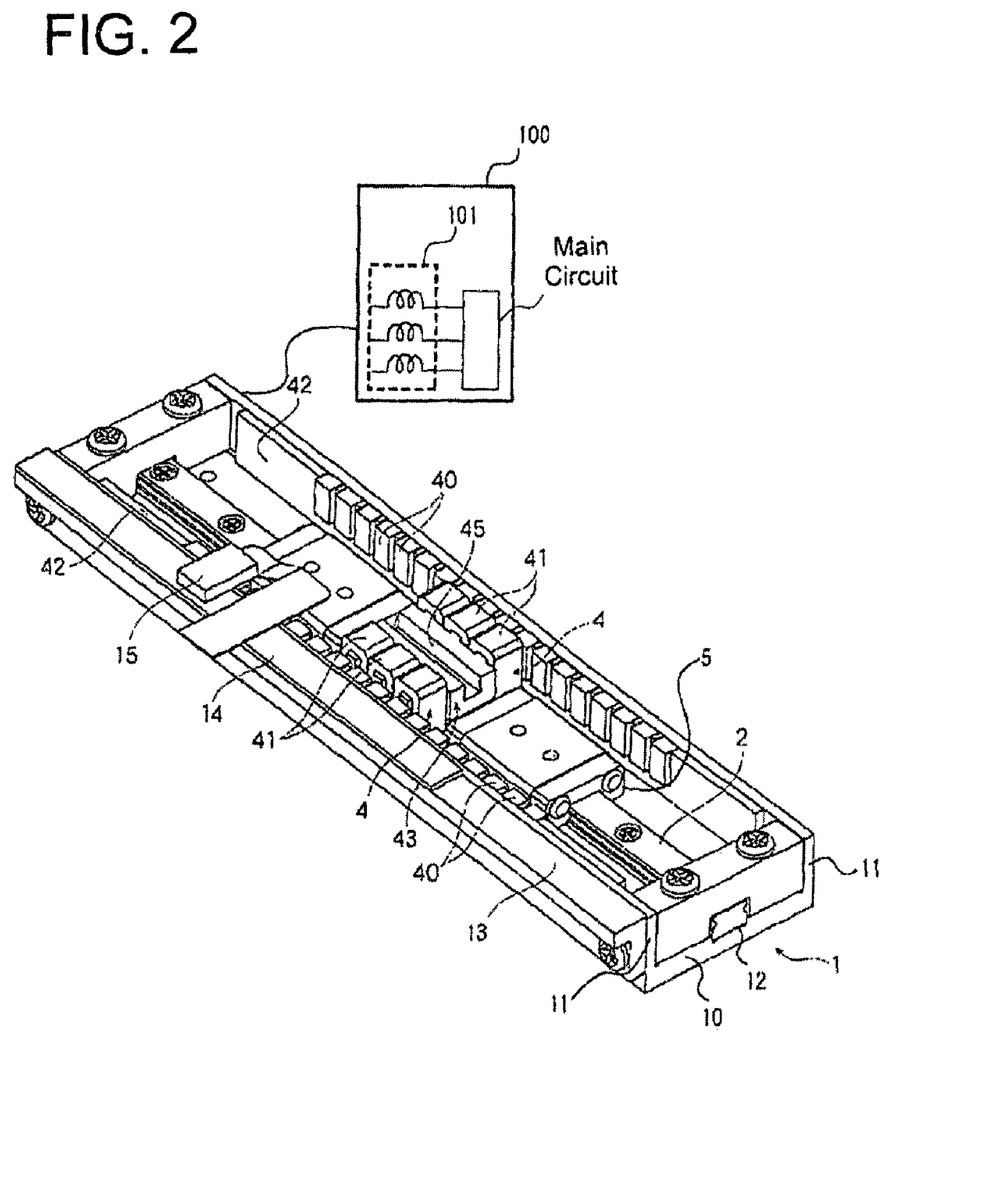
FIG. 2 is a perspective view showing the linear motor actuator of FIG. 1 from which a table plate is removed.

FIG. 2 is a perspective view showing the linear motor actuator of FIG. 1 from which the table plate 6 is removed. The slid block 5 operates in combination with the raceway rail 2 to constitute a linear guide and guides the table plate 6 along the raceway rail 2.

The AC linear synchronous motor 4 is a synchronous linear motor having a time constant of 11 μs, an electric resistance of 2Ω, and an inductance of 22 μH, and has a plurality of stator magnets 40 arranged in a line on each of the side walls 11 of the base member 1 and a pair of exciting coils 41 facing the stator magnets 40 with a slight space interposed therebetween and mounted on the slide table 3.

On each side wall 11 of the base member 1, the stator magnets 40 are arranged in such a manner that the exciting coils 41 face the N pole and the S pole of the magnets 40, alternately. These stator magnets 40 are arranged on holding plates 42 made of synthetic resin and each of the holding plates 42 is adhered to an inner surface of the side wall 11 of the base member 1, thereby facilitating arrangement of the stator magnets 40 on the base member 1. Here, the stator magnets 40 are formed integral with the holding plate 42 by injection molding.

Besides, each of the exciting coils 41 consists of turns of wire wound on a core member made of ferromagnetic material such as iron or the like. In this linear motor actuator, the paired exciting coils 41 are provided facing the stator magnets 40 arranged on the side walls 11 of the base member 1. In the example shown in FIG. 2, these paired exciting coils 41, 41 are formed with use of one core plate 43.

Figure 3:
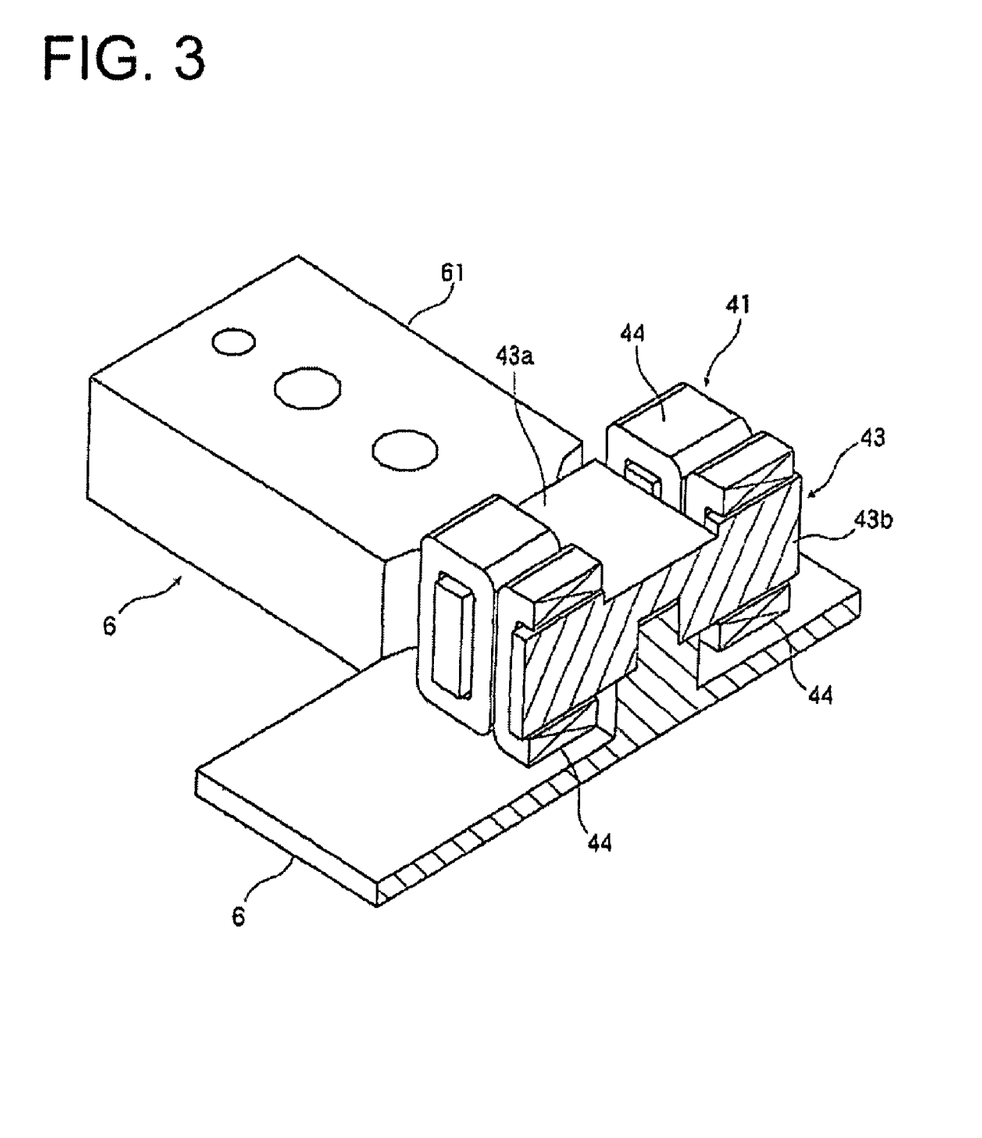
FIG. 3 is a perspective view showing details of a motor part of the linear motor actuator of FIG. 1.

FIG. 3 is a perspective view showing bonding of the table plate 6 and the exciting coils 41, also showing the cross sectional structure of the exciting coils 41. The exciting coil 41 is formed of turns of coil 44 wound on the core plate 43. This core plate 43 has a center part 43a bonded to the table plate 6 and a pair of core parts 43b, 43b positioned to the respective sides of the center part 43a. In each of the core parts 43b, slots are formed for receiving the coils 44.

In other words, as the coils 44 are wound on each core part 43b, the paired exciting coils 41 are formed integral with the core plates 43. Each of the exciting coils 41 has three phase coils 44 of U phase, V phase and W phase. When three-phase alternate current supplied from the AC motor driving apparatus 100 is made to pass through the coils 44, there is generated thrust in the exciting coils 41 along the arrangement direction of the stator magnets 40.

Fixed onto one side wall of the base member 1 is a bracket 13 having an approximately L-shaped cross section (FIG. 2). On an upper surface of this bracket 13, there is a linear scale fixed thereto along the longitudinal direction of the base member 1. In addition, on the lower surface of the table plate 6, an encoder 15 is fixed thereto for reading the linear scale 14 as the table plate 6 moves. The encoder 15 outputs pulse signals at intervals corresponding to the moving speed of the table plate 6.

Current carrying to the exciting coils 41 and transmission of output signals of the encoder 15 are performed with use of flexible printed circuits (FPCs), and these FPCs are fixed onto the lower surface of the table plate 6, drawn from the side of the base member 1 and connected to the AC motor driving apparatus 100.

In the thus-structured linear motor actuator, when three-phase alternate current passes through the exiting coils 41 fixed onto the table plate 6, thrust is produced in the exciting coils 41 along the arrangement direction of the stator magnets 40 and the slide table 3 moves back and forth along the raceway rail 2. The encoder 15 reads the linear scale 14 and outputs signals in accordance with the moving speed and the moving distance of the slide table 3. As the current passage to the exciting coils 41 is controlled with reference to output signals of the encoder 15, back-and-forth motion of the slide table 3 can be controlled freely.

Figure 4:
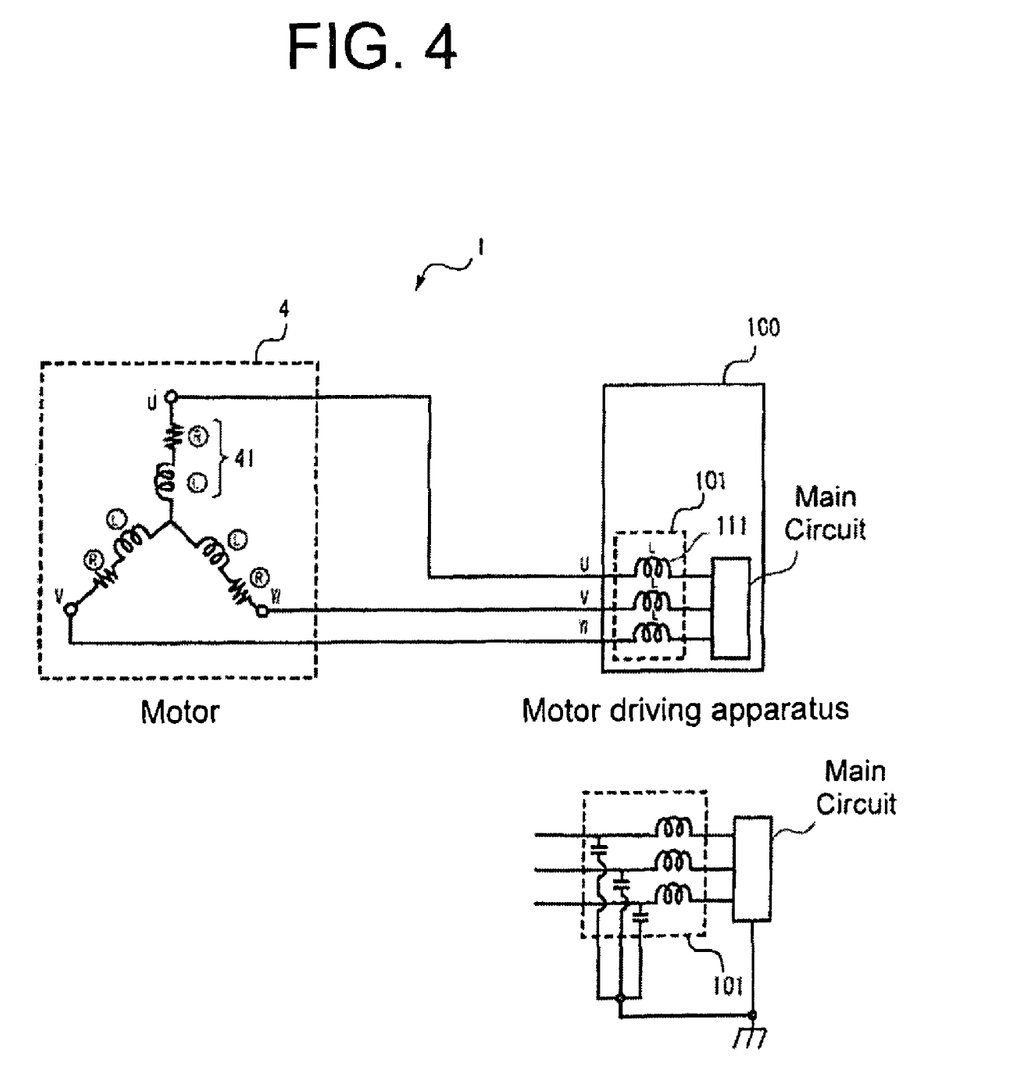
FIG. 4 is a view showing connection between an equivalent circuit of the AC linear synchronous motor and the AC motor driving apparatus 100 having coils and condensers adjusting the motor time constant.

FIG. 4 is a schematic showing connection between the above-described AC linear synchronous motor 4 and the AC motor driving apparatus 100 controlling this. At the voltage output end of the AC motor driving apparatus 100, there are provided time constant adjusting coils 111 for adjusting the time constant of the AC motor. The AC motor driving apparatus 100 controls the AC linear synchronous motor 4 by way of the PWM system. Here, the time constant adjusting coils 111 may be provided in combination with condensers (FIG. 4, lower figure)

Figure 5A:
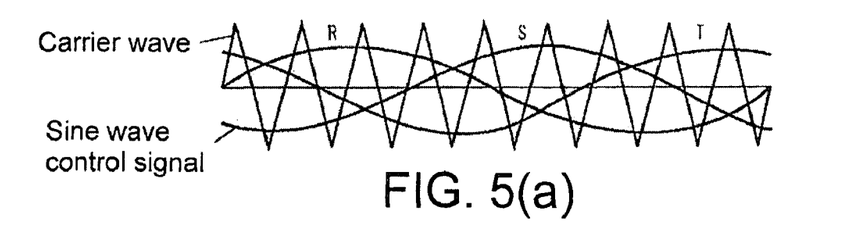
FIGS. 5a-5c show waveforms of exciting coil current when the motor time constant is small, an R-S phase voltage waveform and output voltage pulses by the pulse width modulating system.
Figure 5B:
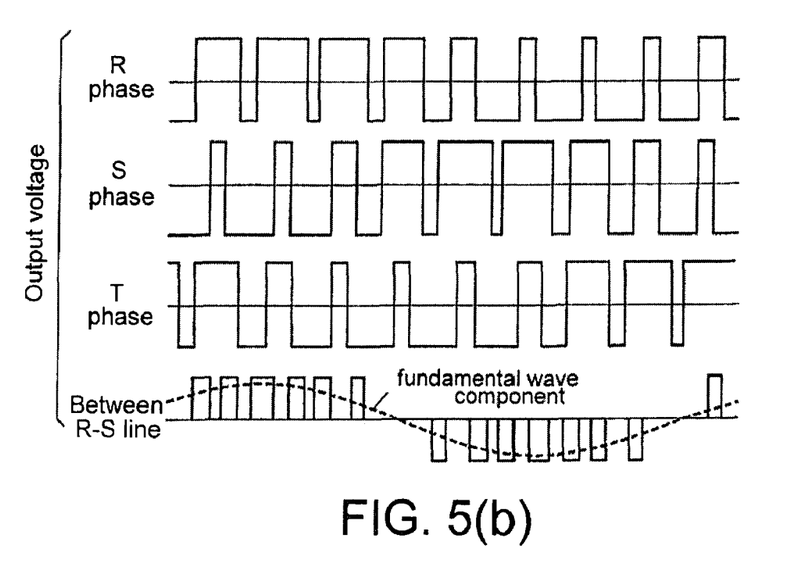

FIG. 5 shows output voltage waveforms of the R, S and T phases of the AC motor driving apparatus 100 and voltage waveforms applied between the R phase and the S phase of the AC linear synchronous motor 4. FIG. 5(a) is a view showing sine wave control signals having frequency equal to a fundamental frequency and a carrier of triangle wave having a frequency higher than the frequency of the sine wave control signals are convoluted and an inverter is commutated at cross points. Control of frequency and magnitude of output voltage is performed by adjusting the amplitude and frequency of sine wave signals. The carrier frequency is used to determine chopping times of output voltage and frequency of harmonic component contained in the output. FIG. 5(b) shows R-phase, S-phase and T-phase output voltage waveforms obtained by chopping of the output voltages by the above-described method, and the voltage between every two of these phases (FIG. 5(b) shows voltage between R-S phases) are adjusted to be sine wave (lower harmonic component is removed).

Figure 5C:
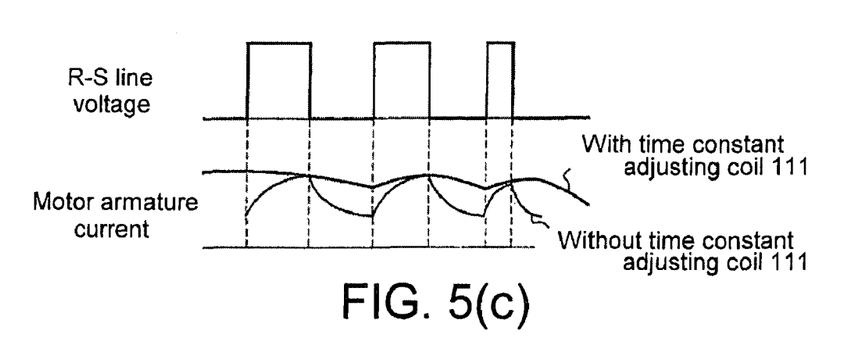

FIG. 5(c) shows an output voltage waveform of a part of the voltage between the R phase and the S phase shown in FIG. 5(b) and a waveform of the exciting coil then. When the carrier frequency is 8 kHz and the time constant of the AC linear synchronous motor 4 is 11 μs, the current does not follow the voltage as shown in the lower view of FIG. 5(c), and undulations appear in the current waveform. As a result, the exciting coil current waveform of the AC linear synchronous motor 4 does not become an accurate sine wave and the current control becomes difficult.

Here, as shown in FIG. 4, time constant adjusting coils 111 for adjusting the time constant of the AC linear synchronous motor are added at the output end of PWM. The time constant adjusting coils 111 added here are preferably determined by relation with carrier frequency. For example, when the carrier frequency is 8 kHz (period 125 μs), the time constant adjusting coils 111 are preferably provided to make the time constant of the AC linear synchronous motor 4 greater (120 μs or more), which is more preferably 2 to 5 times greater than the carrier frequency period.

Thus, as the time constant adjusting coils Ill are added at the output end of the AC motor driving apparatus 100 corresponding to the carrier frequency, undulations in the exciting coil current waveform as shown in FIG. 5(c) can be prevented and stable control of the AC linear synchronous motor 4 is allowed. Besides, as described above, the time constant can be adjusted by combining the time constant adjusting coils 111 with condensers.

Figure 6A:
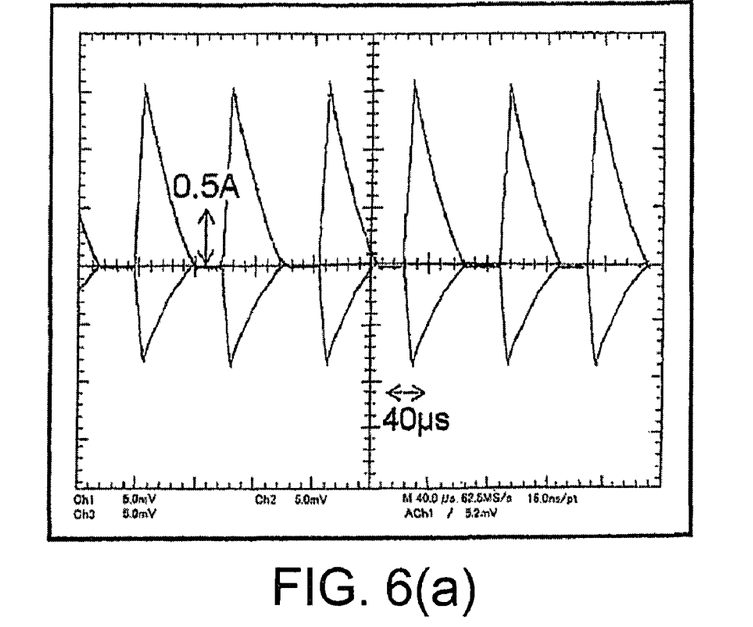
FIGS. 6a-6b show a waveform of exciting coil current when the coil is inserted into the AC motor driving apparatus 100 so as to adjust the time constant of the AC linear synchronous motor and a waveform of exciting coil current when the coil is not inserted.
Figure 6B:
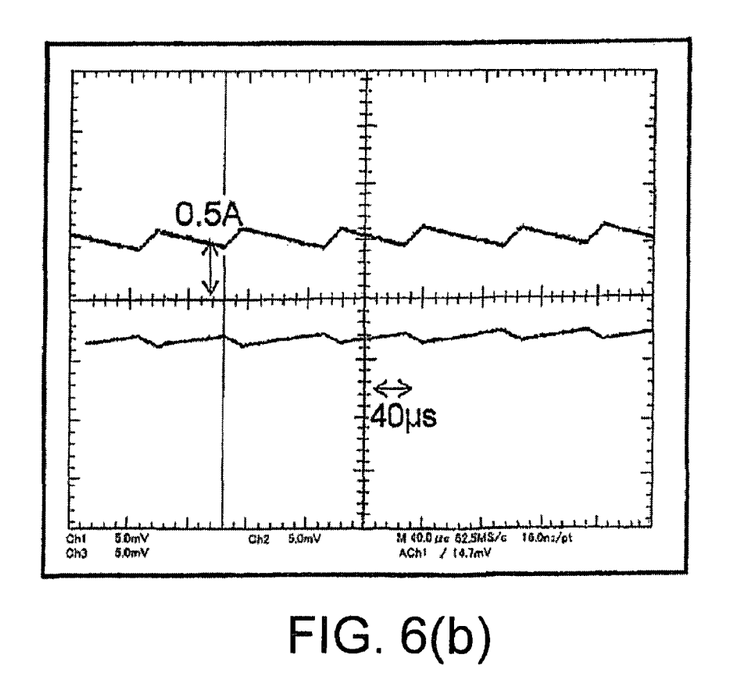

FIG. 6(a) shows a current waveform of the AC linear synchronous motor 4 of which the inductance of the exciting coils is 22 μH and FIG. 6(b) shows a current waveform of the AC linear synchronous motor obtained when 1000 μH is added by the time constant adjusting coils 111. When the time constant adjusting coil 111 is not provided, the current cannot follow the voltage and shows large undulations (triangle waveform: FIG. 6(a)). When the time constant adjusting coils 111 are added, the current waveform does not include undulation (FIG. 6(b)) and can be made close to as sine wave.

Figure 7:
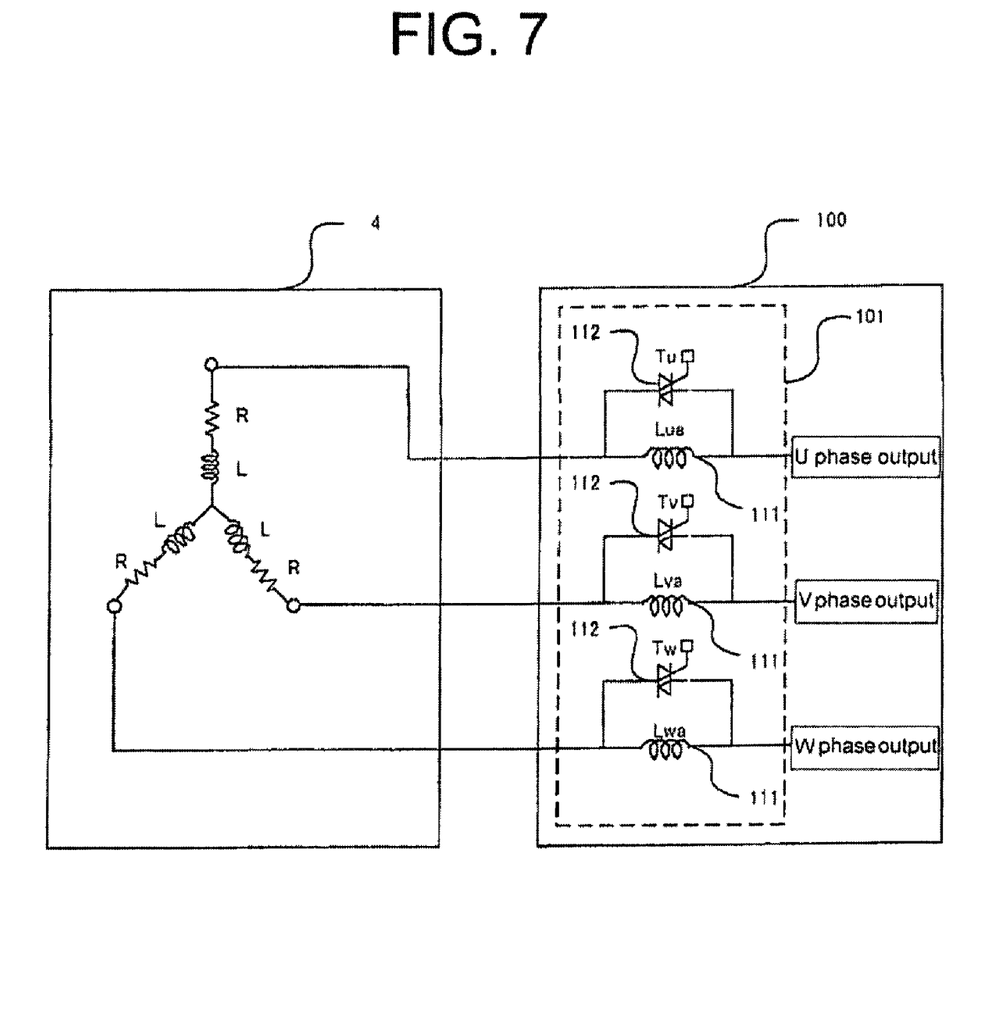
FIG. 7 is a view showing connection between the AC motor and the motor driving apparatus having, as a time constant adjusting part 101, the time constant adjusting coil 111 and the switching element 112 connected in parallel therewith.

FIG. 7 is a view illustrating an embodiment where the time constant adjusting coils 111 for adjusting the time constant of the AC linear synchronous motor 4 are added as a time constant adjusting part 101 and switching elements 112 are corrected in parallel with the time constant adjusting coils 111. The AC linear synchronous motor 4 is started by the AC motor driving apparatus 100 supplying a starting current to the AC linear synchronous motor 4. Preferably, the starting current is increased up to a predetermined current value as soon as possible.

Figure 8:
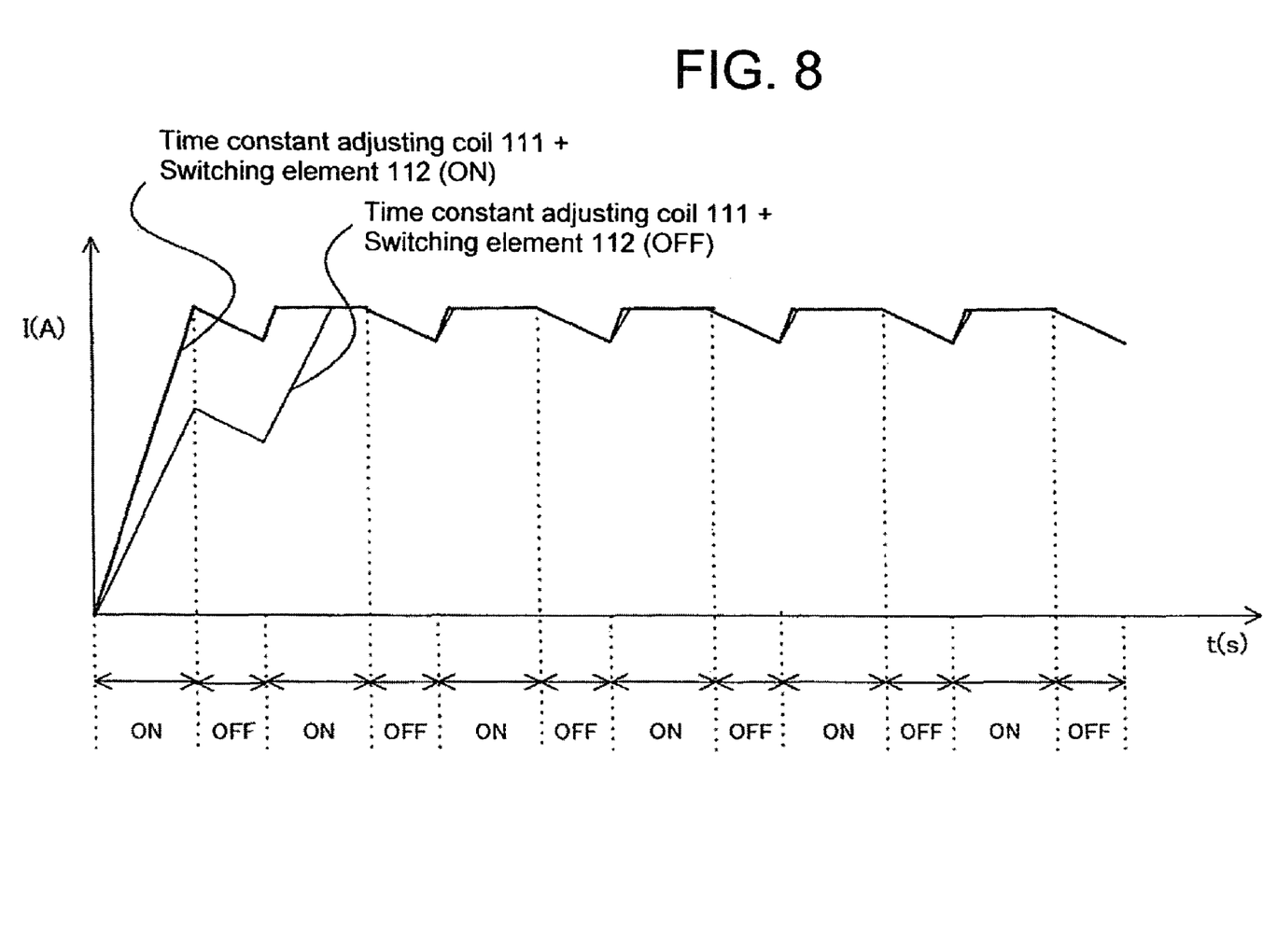
FIG. 8 is a view for comparing time-current characteristics when the switch element 112 is on at starting up and is turned off after the current has reached its rated value with time-current characteristics when the switching element 112 remains off (the horizontal axis indicates times and the vertical axis indicates current).

As the rise time of the starting current is determined by the time constant of the AC linear synchronous motor 4 including the time constant adjusting coils 111, at starting, addition of the time constant adjusting coils 111 delays rising of current as shown in FIG. 8.

However, as shown in FIG. 7, the switching elements 112 (triacs) are provided in parallel with the respective time constant adjusting coils 111 and until the starting current rises, they are controlled to be on so that the starting current passes through the triac 112. With this control, as shown in FIG. 8, the starting current rises immediately and controllability of the AC linear synchronous motor 4 is improved dramatically. In this embodiment, the triac is used as the switching element, however, a photo triac coupler, solid state relay or any other element capable of carrying current bidirectionally may be used in place thereof.

Once the starting current has reached a rated value, the triacs 112 are switched off and the driving current of the AC linear synchronous motor 4 are controlled to pass through the time constant adjusting coils 111. This control enables stable control even if the AC linear synchronous motor has an extremely small time constant, for example, 1 μs or less. Here, the ON/OFF time shown in FIG. 8 shows a carrier period of the PWM device. Besides, the vertical axis indicates currents (Arms) determined by the motor parameter.

Example 1

A square shaped linear motor was selected as an AC linear synchronous motor of the linear motor actuator. This square shaped linear motor has a rated power of 0.13 N and a maximum power of 0.4 N. The rated current is 0.27 Arms and the maximum current is 0.8 Arms. The electric resistance is 2Ω, the inductance is 22 μH and the time constant of this AC motor is 11 μH. This AC linear synchronous motor has a winding of φ=0.11 mm having 48 turns.

As the time constant adjusting coil 111, 2000 μH coil was added to each phase at the output end of the AC motor driving apparatus 100, and the time constant was adjusted to 412 μs. Then, the AC motor did not vibrate and there occurred no noise, and stable control of the linear motor actuator was allowed.

Example 2

A round shaped linear motor was selected as an AC linear synchronous motor of the linear motor actuator. This round shaped linear motor has a rated power of 0.048 N and a maximum power of 0.145 N. The rated current is 0.1 Arms and the maximum current is 0.3 Arms. The electric resistance is 13.2Ω, the inductance is 16 μH and the time constant of this AC motor is 1.21 μH. This AC linear synchronous motor has a winding of φ=0.07 mm having 60 turns.

As a time constant adjusting coil 111 of this linear synchronous motor, 3000 μH coil was added to each phase at the output end of the AC motor driving apparatus 100, and the time constant was adjusted to 324 μs. Then, the AC motor did not vibrate and there occurred no noise, and stable control of the linear motor actuator was allowed.

The present specification is based on Japanese Patent Applications No. 2006-98311 filed on Mar. 31, 2006 and No. 2006-124930 filed on Apr. 28, 2006, the entire contents of which are expressly incorporated by reference herein.

The invention claimed is:

1. An AC motor driving apparatus comprising: an inverter; a PWM (pulse width modulation) device for PWM controlling an output voltage to be supplied at least to an AC motor; and a time constant adjusting coil at an output end of the PWM device, wherein a capacity of the time constant adjusting coil is controlled in such a manner that the time constant of the AC motor is greater than or equal to a period of the carrier frequency of the PWM device.

2. The AC motor driving apparatus according to claim 1, further comprising a time constant adjusting condenser at the output end of the PWM device.

3. The AC motor driving apparatus according to claim 2, wherein a capacity of the time constant adjusting coil and condenser is controlled in such a manner that the time constant of the AC motor is greater than or equal to the period of the carrier frequency of the PWM device.

4. The AC motor driving apparatus according to claim 1, wherein the capacity of the time constant adjusting coil is controlled in such a manner that the time constant of the AC motor is two to five times greater than the period of the carrier frequency.

5. The AC motor driving apparatus according to claim 1, further comprising a switching element connected in parallel with the time constant adjusting coil.

6. The AC motor driving apparatus according to claim 5, wherein the switching element is an element capable of carrying current bidirectionally.

7. The AC motor driving apparatus according to claim 5, further comprising means for controlling the switching element in such a manner that current does not pass through the time constant adjusting coil at least during first pulses output from the PWM device when the AC motor starts up.

8. An AC motor control method using a PWM (pulse width modulation) system of controlling at least one of a pulse number, a pulse interval and a pulse width of a pulse-shaped AC voltage to adjust a voltage to be supplied to an AC motor, the AC motor control method comprising:
arranging a time constant adjusting coil between an output end of the PWM system and the AC motor; and
controlling a capacity of the time constant adjusting coil in such a manner that the time constant of the AC motor is greater than or equal to a period of the carrier frequency of the PWM system.

9. The AC motor control method according to claim 8, further comprising: arranging a time constant adjusting condenser between the output end of the PWM system and the AC motor and changing a capacity of the time constant adjusting coil and condenser to adjust the time constant of the AC motor.

10. The AC motor control method according to claim 9, wherein controlling the capacity of the time constant adjusting coil and condenser is performed in such a manner that the time constant of the AC motor is greater than or equal to the period of the carrier frequency of the PWM system.

11. The AC motor control method according to claim 8, wherein controlling of the capacity of the time constant adjusting coil is performed in such a manner that the time constant of the AC motor is two to five times greater than the period of the carrier frequency.

12. The AC motor control method according to claim 8, further comprising: connecting a switching element in parallel with the time constant adjusting coil; and controlling the switching element in such a manner that current does not pass through the time constant adjusting coil at least during first pulses output from the PWM system when the AC motor starts up.

\* \* \* \* \*